(No Model.) 2 Sheets—Sheet 2.
H. HOMMERBERG.
APPARATUS FOR CLOSING AND HAULING IN FISHING NETS.
No. 532,962. Patented Jan. 22, 1895.

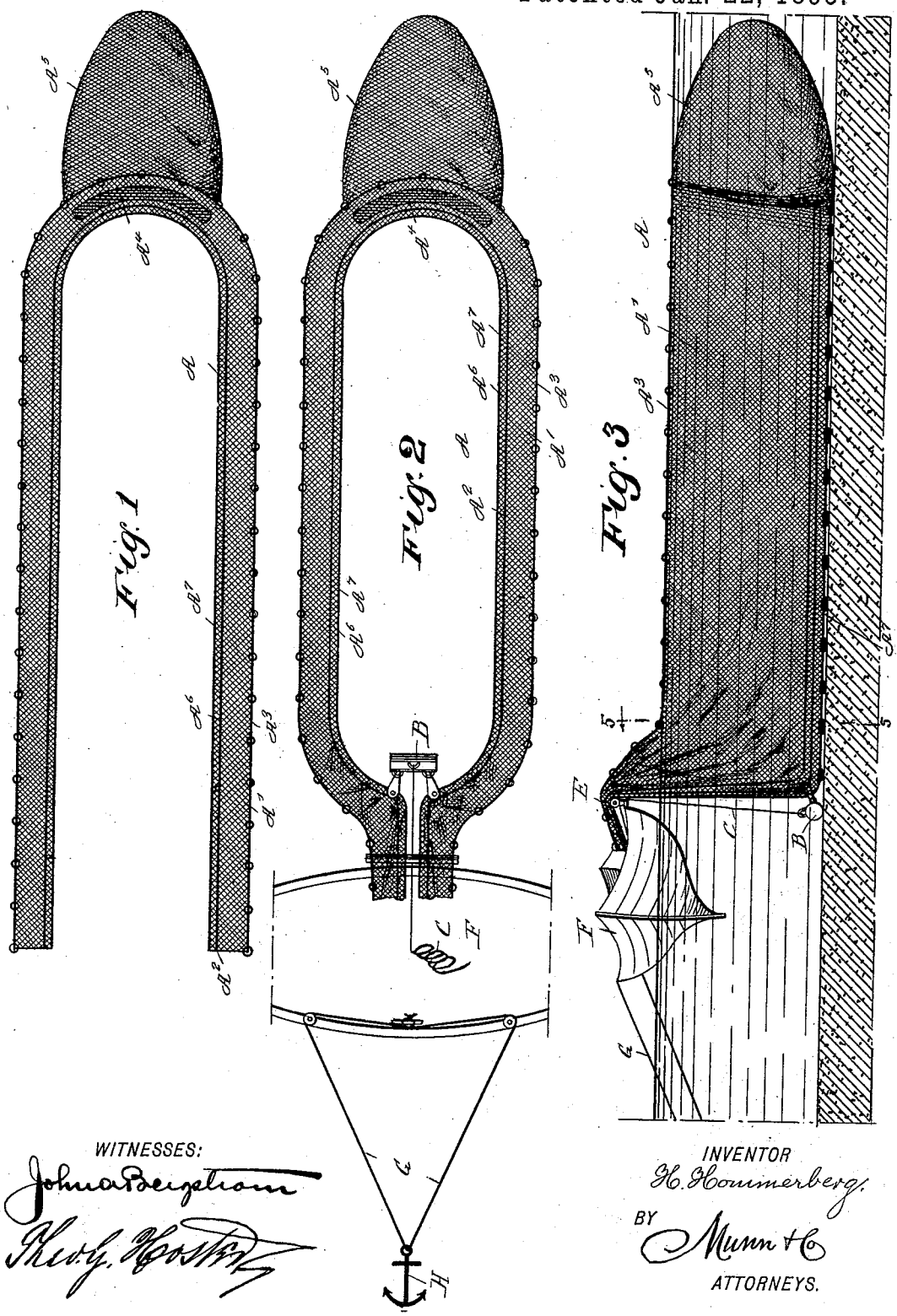

WITNESSES: INVENTOR
H. Hommerberg.
BY Munn & Co.
ATTORNEYS.

UNITED STATES PATENT OFFICE.

HARALD HOMMERBERG, OF BROOKLYN, NEW YORK.

APPARATUS FOR CLOSING AND HAULING IN FISHING-NETS.

SPECIFICATION forming part of Letters Patent No. 532,962, dated January 22, 1895.

Application filed August 29, 1894. Serial No. 521,625. (No model.)

*To all whom it may concern:*

Be it known that I, HARALD HOMMERBERG, a subject of the King of Sweden and Norway, and at present residing in the city of Brooklyn, county of Kings, and State of New York, have invented a new and Improved Apparatus for Closing and Hauling in Fishing-Nets, of which the following is a full, clear, and exact description.

The object of the invention is to provide a new and improved apparatus for closing and hauling in fish nets or seines, without requiring the pulling of the nets on shore and without danger of losing any of the entrapped fish.

The invention consists in providing a weight block adapted to be secured to and slid along the lower edges of the opposite ends of the net when the same is to be hauled in whereby the said lower edges of the net are held together, all as will be hereinafter fully set forth.

The novel features of the invention will be carefully defined in the claims.

Reference is to be had to the accompanying drawings, forming a part of this specification, in which similar letters of reference indicate corresponding parts in all the figures.

Figure 4:
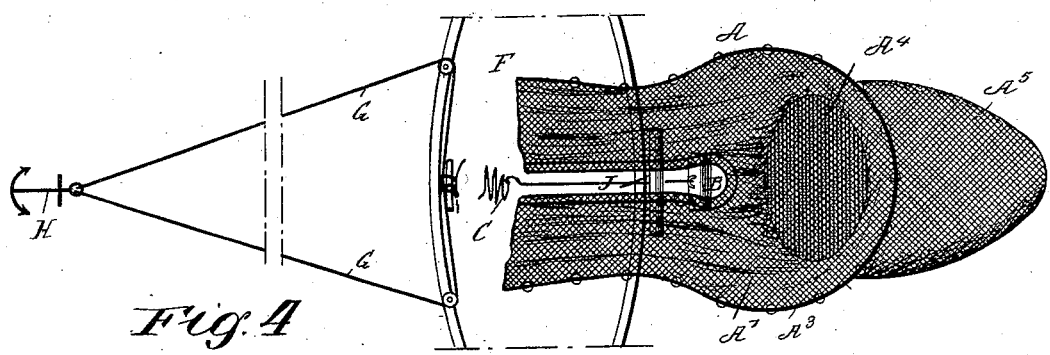
Figure 5:
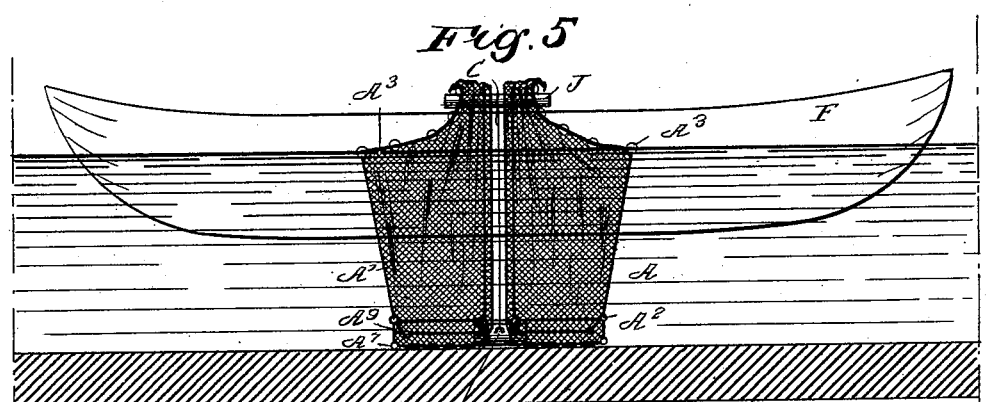
Figure 6:
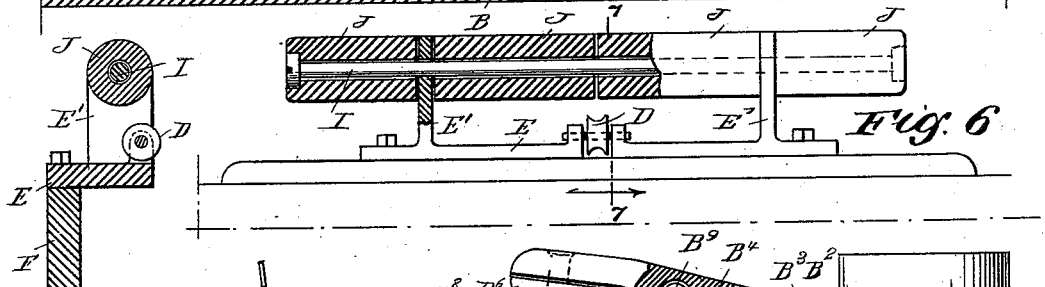
Figures 7, 8, 9:
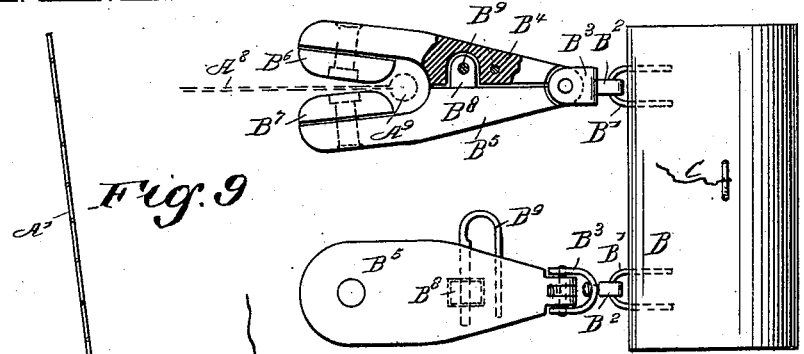

Figure 1 is a plan view of the net as set out for trapping the fish. Fig. 2 is a like view of the improvement showing the weight block in place on the closed end of the net. Fig. 3 is a side elevation of the same. Fig. 4 is a plan view of the improvement, showing the net hauled in sufficiently to drive the fish into the bag. Fig. 5 is a transverse section of the improvement on the line 5—5 of Fig. 3. Fig. 6 is an enlarged side elevation, with parts in section, of the rollers for the lines and net. Fig. 7 is a transverse section of the same on the line 7—7 of Fig. 6. Fig. 8 is an enlarged plan view of the weight block, parts being in section; and Fig. 9 is an enlarged sectional side elevation of the lower part of the net with the weight block attached.

The net A is made rectangular in shape and is set out in U form, as indicated in Fig. 1, so that the fish are partly inclosed and can pass through the open end of the net, as will be readily understood by reference to Fig. 1.

The net A is provided with the usual netting A' extending between the bottom line $A^2$ and the top, float line $A^3$, provided with suitable floats for holding such line, and consequently the upper edge of the net, on the surface of the water. In the middle part of the netting A' is formed an opening $A^4$ leading to the bag $A^5$, which extends from the rear end of the net when the latter is set out, as will be understood by reference to Figs. 1, 2 and 3. From the bottom line $A^2$ extends a flap $A^6$, made either of netting or canvas or other suitable material, and on the lower edge of this flap $A^6$ is arranged the weight line $A^7$ for holding the lower edge of the net on the bottom of the river, lake or ocean in which the fishing is done. From the bottom line $A^2$ also extends a flap $A^8$ carrying at its outer end a block line $A^9$ adapted to be engaged by the weight block B, hereinafter more fully described. A third flap $A^{10}$ extends from the bottom line $A^2$ and serves as a cover for the flap $A^8$ and its line $A^9$, so that the latter are between the flaps $A^6$ and $A^{10}$, as will be readily understood by reference to Fig. 9. By this arrangement the block line $A^9$, and also the slidable weight block B, are protected from sea-weed and other matter on the bottom of the river, &c.

The slidable weight block B is provided with one, two or more staples B', each engaged by a swivel $B^2$ connected with a yoke $B^3$ in which are pivoted the block sections $B^4$ and $B^5$, adapted to be opened and closed, and when in a closed position they form a fork at their outer ends, as will be readily understood by reference to Fig. 8. In the forked ends of the sections $B^4$ and $B^5$ are journaled the disks $B^6$ and $B^7$, arranged opposite each other and extending at angles to one another so as to form, at their inner ends, a bearing for the block line $A^9$, at the same time forming a clear passage for the flap $A^8$, so that the block line $A^9$ with its block $A^8$ can readily pass along the weighted sections when hauling in the net, as hereinafter more fully described.

In order to lock the sections $B^4$ and $B^5$ together, I provide the section $B^5$ with an apertured lug $B^8$, extending into a recess in the section $B^4$ and adapted to be engaged by a linchpin $B^9$ held in the section $B^4$. See Fig. 8. By removing the linchpin $B^9$ the two sections can be readily swung apart so as to permit the insertion of the block line $A^9$ and the flap A⁸, or removal of the same, as the case may require.

The block B is held on a weight line C, adapted to pass over a pulley D, journaled in a bracket E, secured to one edge of the boat F, used by the fisherman to set out the net, to close the same and to haul the fish to shore together with the net, as hereinafter more fully described. The boat F is provided with anchor lines or chains G, carrying an anchor H, for anchoring the boat in the river, or other body of water in which the fishing is done. On the bracket E, are formed arms E', see Figs. 6 and 7, carrying a pin I, on which are journaled loosely the rollers J, of which two preferably extend between the arms E' and one on the outside of each arm, as is shown in the drawings. These rollers J facilitate the hauling in of the lines and portions of the nets, at the same time preventing entanglement of the line C with parts of the net.

The operation is as follows: After the net is set out, as illustrated in Fig. 1, and fish are entrapped between the sides of the net, then the fishermen anchor the boat F at the mouth of the net, draw in the ends of the net, without disturbing the sides and rear of the net as illustrated in Fig. 2. The fishermen then open the sections B⁴ and B⁵ of the weight block B to engage the ends of the block line A⁹, as is plainly shown in Fig. 2, after which this weight block B is put overboard and is lowered to the bottom of the river by the line C. The weight B thus causes the ends of the weight line A⁷ to come close together, and as the float line A³ is now held closed in the bottom of the boat, the entire net is closed, so that the fish are entrapped within the net and cannot escape. The net is now pulled in by the fishermen in the boat F so that the weight block B, however, holds the lower edge of the net in a closed position, until the net has been hauled in a sufficient distance so that the entrapped fish must necessarily pass into the bag A⁵. When this has been done the weight block B is likewise hauled up, together with the bottom line A², the weight line A⁷, and block line A⁹, and then the fish are removed from the bag A⁵ in any suitable manner.

The above described operation is then repeated; that is, the net is set out as above described and shown in Fig. 1, after which the ends of the net are closed, the weight block B is again attached to the end of the block line A⁹, and let down to the bottom of the river to completely close the net. The latter is then hauled in as described to again entrap the fish in the bag A⁵.

It will be seen that by the use of my apparatus it is not necessary to haul the nets into shore as now practiced, but the net is closed after the fish are entrapped in the river or lake, without leaving the fishing ground.

It is further understood that in hauling in the net as above described the anchor lines G are slackened, so as to permit the boat to travel in the direction of the hauling in of the net, whereby the bag A⁵ together with the rear end of the net, remains completely at a standstill.

Having thus described my invention, I claim as new and desire to secure by Letters Patent—

1. A fishing net provided with a block line secured to its lower edge, and adapted to be held against longitudinal movement independently thereof, and a weight block slidingly mounted on said block line, substantially as set forth.

2. A fishing net provided at its lower part with a flap, a block line secured to said flap, and a weight block having a slidable connection with the block line and flap, substantially as set forth.

3. A fishing net provided at its lower part with a flap, a block line secured to said flap, a weight block detachably secured to said flap and block line and adapted to be slid along the same, and a weight line connected to the block whereby the same may be hauled in, substantially as set forth.

4. A fishing net provided at its lower edge with a block line held on a flap, a weight block having a slidable connection with the said block line, and a second flap held on the lower end of the net and adapted to protect the block line flap and the block, substantially as shown and described.

5. An apparatus for closing and hauling in fishing nets, provided with a weight block comprising a weight, block sections, a swivel connection between the block sections and the said weight, and disks journaled in the ends of the said block sections, substantially as shown and described.

6. An apparatus for closing and hauling in fishing nets, provided with a weight block comprising a weight, block sections, a swivel connection between the block sections and the said weight, disks journaled in the ends of the said block sections, and means, substantially as described, for closing the said block sections, as set forth.

7. An apparatus for closing and hauling in fishing nets, provided with a bracket secured on the boat and carrying a pulley for the weight line, a pin held on the arms of the said bracket and rollers journaled loosely on the said pin, substantially as shown and described.

HARALD HOMMERBERG.

Witnesses:
  THEO. G. HOSTER,
  JNO. M. RITTER.